L. ONDERDONK.
SERVING MECHANISM.
APPLICATION FILED NOV. 10, 1911. RENEWED MAY 3, 1918.

1,289,238.

Patented Dec. 31, 1918.
4 SHEETS—SHEET 1.

Witnesses:

Inventor:

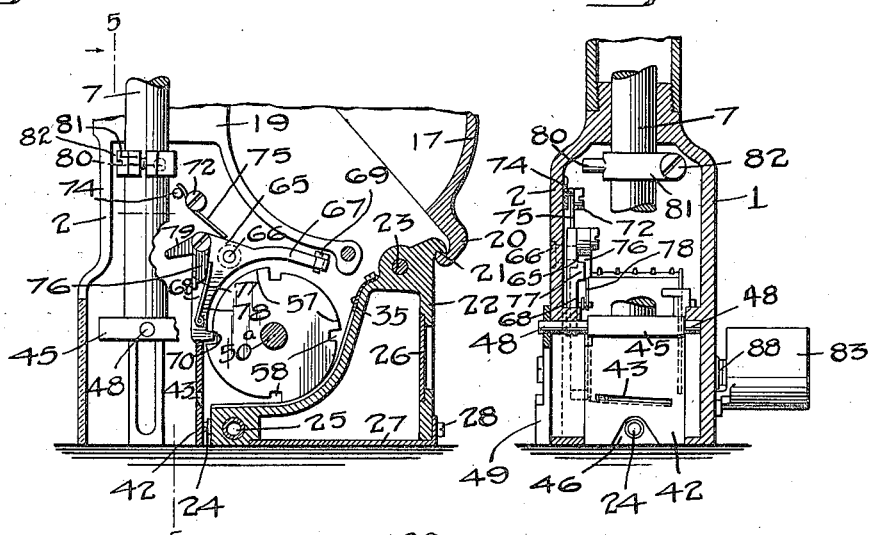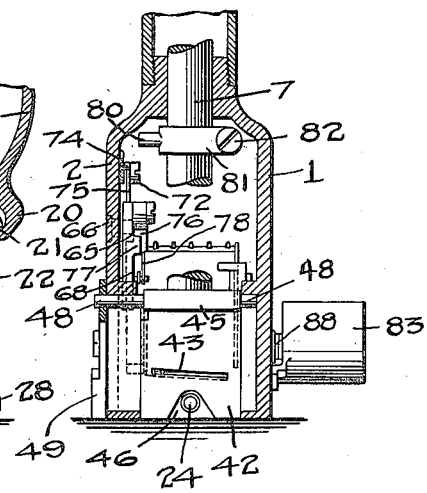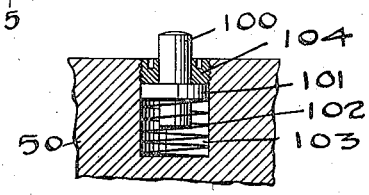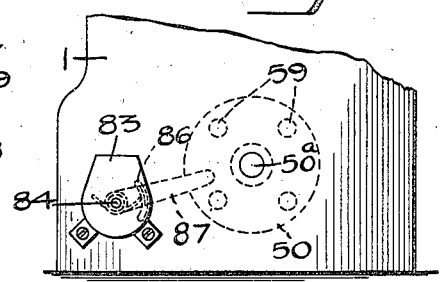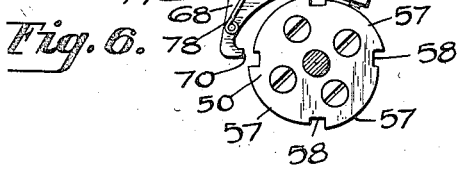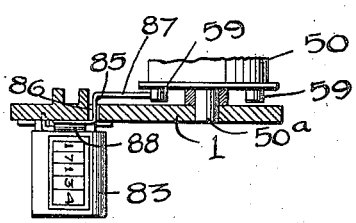

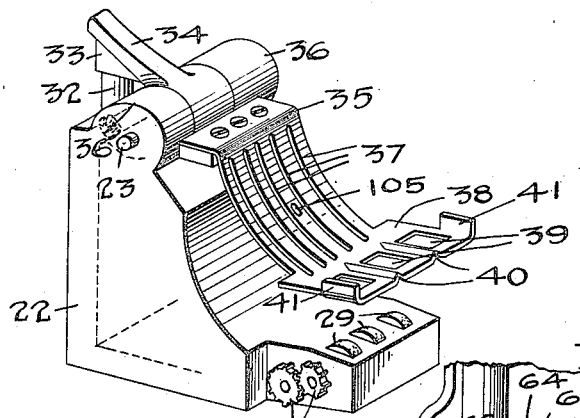

L. ONDERDONK.
SERVING MECHANISM.
APPLICATION FILED NOV. 10, 1911. RENEWED MAY 3, 1918.

1,289,238.

Patented Dec. 31, 1918.
4 SHEETS—SHEET 4.

Witnesses:
Inventor:

UNITED STATES PATENT OFFICE.

LANSING ONDERDONK, OF NEW YORK, N. Y.

SERVING MECHANISM.

1,289,238.  Specification of Letters Patent.  Patented Dec. 31, 1918.

Original application filed September 28, 1910, Serial No. 584,195. Divided and this application filed November 10, 1911, Serial No. 659,621. Renewed May 3, 1918. Serial No. 232,386.

*To all whom it may concern:*

Be it known that I, LANSING ONDERDONK, a citizen of the United States, residing in the borough of Manhattan, city, county, and State of New York, have invented a new and useful Improvement in Serving Mechanism, of which the following is a description.

This invention relates, generally speaking, to serving mechanism, that is, mechanism capable of delivering articles of various kinds. Particularly, the serving mechanism is intended to deliver or vend articles of various kinds wound in webs or reels and to serve such articles one by one successively.
In order to illustrate my invention, I have shown the same applied to a stamp-affixing machine, such as made the subject of my application for patent filed September 28, 1910, Serial Number 584,195, of which this application is a division. I wish it understood, however, that in its broad features my invention is not limited to any particular type of machine, the stamp-affixing machine of my aforesaid application being used only as a convenient medium for disclosing my present invention and showing a practical application thereof.

Among the objects of my invention may be noted the following: to provide a machine adapted particularly for feeding perforated webs; to provide a feeding mechanism which will be positive in operation, simple in construction and accurate in its manipulation of the article; to provide a feeding mechanism comprising a plurality of yielding points adapted to register with the perforations between the articles of the web or strip and feed the latter by such operation; to provide a feeding mechanism which will not tear or mutilate the articles or web, but will be positive and accurate in its action; to provide a means by which to positively lock the feeding mechanism from action should the web break or give out; to provide means whereby the machine may be locked to a table or support and removed therefrom at will; and to provide certain novel details of construction involving the feed-drum and its actuating mechanism, the locking mechanism for said drum, the counter actuating mechanism, and other associated parts which will render the machine positive and accurate in operation, simple in construction and cheap to manufacture.
With the above objects in view, and others which will be detailed during the course of this description, my invention consists in the parts, features, elements and combinations of elements and mechanisms, all as herein-
after described and claimed.

In order that my invention may be clearly understood, I have provided drawings wherein:

Fig. 4 is a sectional detail showing the feed-drum-controlling mechanism and other details of construction;

Fig. 5 is a section substantially on the line 5—5 of Fig. 4;

Fig. 6 is a side elevation of the drum-controlling mechanism in a position different from that in Fig. 4;

Fig. 7 is a sectional detail of the feed-drum showing the locking-pin;

Fig. 8 is an elevation of a portion of the base of the machine showing the coöperative arrangement of the counting mechanism and the feeding mechanism;

Fig. 9 is a sectional elevation showing the parts of Fig. 8;

Fig. 10 is a perspective view of one form of moistening-device and strip-guide;

Fig. 11 is a horizontal sectional view on the line 11—11 of Fig. 1;

Fig. 12 is a transverse, vertical section taken just in rear of the feed-drum of Fig. 1;

Fig. 13 is a side elevation of a portion of the machine, a part of the frame being in section;

Fig. 14 is a view similar to Fig. 13 looking at the machine from the opposite side;

Figure 1:
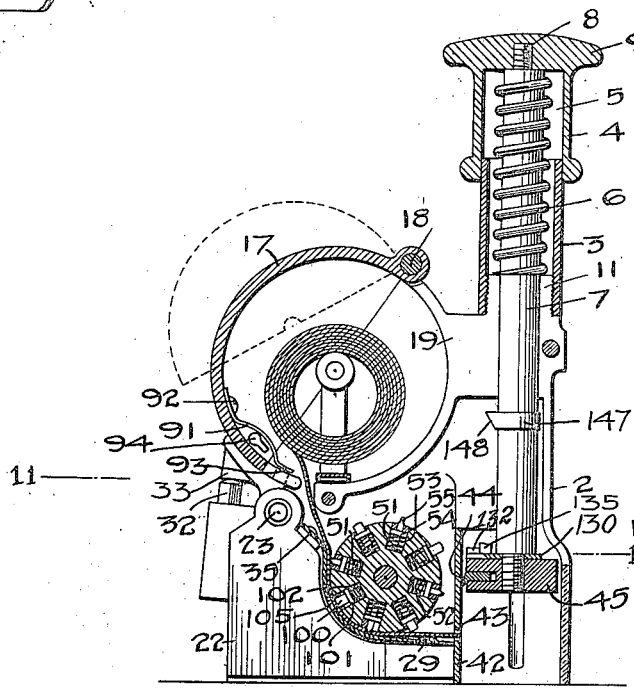
Figure 1 is a sectional elevation of one form of my invention taken substantially centrally of my machine from front to rear.
Figure 2:
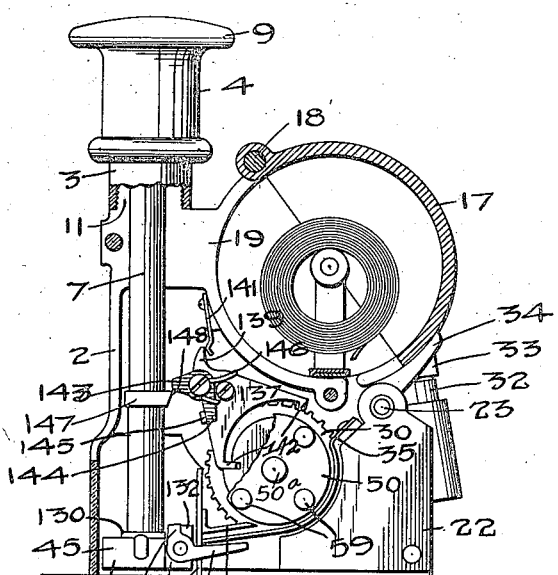
Fig. 2 is a partial elevation and section of the machine of Fig. 1 looking at the opposite side.

Referring to the drawings, the frame-portion of the machine is composed of like parts 1 and 2, secured together by screws or rivets, and also by a cylindrical handle-portion 3, with which coöperates a sliding-sleeve 4, the said parts 3 and 4 producing a chamber 5, within which a spring 6 is housed and which surrounds a plunger 7, the upper end of which is provided with a reduced extension 8, screw-threaded into the head 9 of said sleeve, the said spring engaging the head 9 at the upper end of the plunger and the circular portion 11, which is formed by the two frame-parts 1 and 2, at the bottom. The frame is provided with a cover 17, hinged thereto by pin 18, and forming part of a receptacle, the other portion 19 of which is formed in the two-part frame. The cover is normally closed by means of a latch-portion 20, in the form of Fig. 4, carried at the lower end thereof and engaging with a catch-portion 21, on the upper end of a reservoir 22, which latter is journaled at 23, so as to swing downwardly from the frame, said reservoir extending clear to the bottom of the machine-frame. This form of reservoir, in the stamp-affixing machine of my aforesaid application, has a spraying-nozzle 24, fed by a rotary-valve 25, and has a transparent back-plate 26, and removable bottom-plate 27, held by screw 28. In the form of Figs. 1, 2, 10, 11 and 12, the reservoir is provided with rotary disk-pads 29, operated by gearing 30, which also operate a measuring-device or valve 31, the gearing being actuated from the feed-drum, presently described. The reservoir is held in its operative position by a spring-pin 32, engaging at its top with the lug 33, of the strip-guide lever 34, which latter coöperates with the cover 17, the coöperative action of these parts also causing the strip-guide 35 to be depressed into operative position as shown in Figs. 1, 2 and 12. The strip-guide is journaled on the pin 23, between the lugs 36, and is slotted at 37 for the passage of the feed-pins of the feed-drum and has the article-support 38, at its lower end, provided with apertures 39, for the play of the moistening-disks 29, and between the apertures with supporting-ribs 40, to prevent the article from sticking to the guide and from being moistened over its entire surface. End lugs 41 also prevent the article from being displaced laterally. In all the forms, the face-plate 42 is arranged in front of the feeding-drum and reservoir and has a slot 43, through which the article is fed preparatory to being cut off by the cutter 44, carried by the head 45, on the lower end of the plunger 7, the lower edge or wall of said slot 43 being the coöperating or ledger blade. In the form of Figs. 4 and 5, the passage 46, in the face-plate, admits the nozzle 24; and 47 indicates a locking-device for the reservoir. Pins or lugs 48 guide the head in the frame and prevent the plunger from turning; and in the form of Fig. 4 one of the pins is extended into coöperation with a lever 49, by which the valve 25 is operated. All these features, thus generally described, have not been set forth more in detail, since they form no part of my present invention specifically considered.

The feeding mechanism of this form of my invention comprises the feed-drum composed of a cylinder or barrel 50, having a plurality of radial apertures or sockets 51, in each of which is set a coiled-spring 52, surrounding a stem 53, and bearing at its outer end against a head 54 of said stem, which head has projecting from it a round pointed feeding-pin 55, several of which project through each of the plates 56, arranged longitudinally of said drum and set with its surface flush with the surface of said drum. Thus the pins normally project from the periphery of the drum in parallel rows. At one end the drum is provided with a plurality of circumferentially-extending cams 57,—four in number,—or a plate secured to the said drum, the periphery of which is formed into said cams, said cams being produced by tangential surfaces extending from one notch 58 to another around the periphery of said disk or drum. The notches 58 are arranged between the high part of one cam and the low part of the next adjacent cam and just in advance, in the direction of travel of the drum, of a row of feeding-pins 55. The opposite end of the drum is provided with a plurality of studs 59, extending therefrom parallel with the axis thereof, there being four in number corresponding to the four notches and cam surface. The studs are arranged, considering the direction of feed of the drum, just behind the rows of feeding-pins 55. The circumference of the feed-drum, as herein shown, for example, is the exact length or width, as the case may be, of four postage stamps, it being understood that the stamps, or other articles, may be joined by perforations along their lengths or along their widths; and the circumference of the drum may be varied to any extent to accommodate any character of article desired to be vended or delivered or affixed. The cutter-holder 45, which is fixed to the plunger 7, has on its upper surface a lug 60, form of Fig. 13, affording a journal for an actuating-pawl, the long arm 61 of which extends into the path of movement of the pins 59, and the short arm 62 of which is arranged so as to engage a cam 63, provided on the side of the frame-part 2, directly in the path of movement of said arm. Preferably, the arms of the pawl are arranged substantially at a right-angle to each other and the normal position of said pawl is substantially that shown in Fig. 13.

The lug 60 is provided with a laterally-extending stop 64, against which the short arm 62 of the pawl engages, said lug operating as a stop to prevent the long arm thereof from being pushed farther down than substantially parallel with the head 45 of the plunger. This stop 64, on the one hand, and the cam 63, on the other, constitute means whereby the pawl is positively actuated and is positive in its action in driving the feed-drum, and by which the use of springs to return the pawl to operative position is obviated. For every reciprocation of the plunger, the feed-pawl gives a single feed movement to the feed-drum, this feed movement occurring on the upstroke of the plunger. A detent-device, comprising the bell-crank lever 65, is journaled in the frame-portion 2 of the machine, just above the feed-drum, as at 66, and having one arm 67 extending substantially horizontally over the periphery of the cams of the feed-drum and the other arm 68 descending substantially vertically into position to coöperate with said cams 57 and the notches 58 of said drum. The arm 67 is provided with an adjustable pin or screw 69, extending therethrough at a right-angle for engagement with the cams and the other arm 68 is provided with a toe 70, for coöperation with said notches. The lever 65 is normally held with its toe 70, in one of the notches 58, as shown in Fig. 4, by means of the spring coiled about the stud or screw 72, projecting from the frame-portion 2 of the machine and maintained under tension by means of a pin 74, projecting from said frame-portion, with which engages the short arm of the spring with a normal tendency to force the long arm 75 of the latter yieldingly into engagement with the bell-crank lever just forward of its fulcrum. Forward of its fulcrum, the bell-crank lever also carries a spring-controlled pawl, one arm 76 of which is held in engagement with an abutment 77, carried by the bell-crank lever by means of the spring 78, fixed to the depending-arm 68, of said lever. The other arm 79 of the pawl is thus held in the path of movement of a pin 80, projecting from the plunger 7, said pin 80, in this instance, being carried by a collar 81, clamped upon said plunger and adjustable thereon by means of the clamping-screw 82. Adjustment of the pin 69 regulates the extent to which the bell-crank lever may be moved so as to force its toe 70 from the notches of the feed-drum. A downward movement of the plunger causes its pin 80 to strike the arm 79 of the pawl on its top and thus drive it downwardly against the tension of its spring 78, this movement aiding the spring 75 to keep the toe 70 in coöperative connection with one of the notches 58. The upward movement of the pin striking the arm 79 of the pawl on its under side lifts said arm of the pawl,—the spring 78 having returned said pawl into engagement with the abutment 77 on the lever,—thus operating the lever 68 against the tension of its spring 75 and causing the positive and quick withdrawal of the toe 70 from a notch 58 and causing the pin 69 to engage the periphery of one of the cams 57. See Fig. 6. The swinging of the lever 65, upon its fulcrum, moves the pawl away from the pin 80, thus allowing the latter to pass on its upward movement and the spring 75 to again assume control of lever 65 and return its toe 70 into engagement with the cam-periphery of the feed-drum ready for coöperation with a notch 58. This mechanism operates as a positive lock to prevent overthrow of the feed-drum in either direction, and also has the important function of preventing said drum from being turned more than the length of a stamp or other article by any means other than the plunger. When the toe 70 is out of engagement with a notch 58, the screw 69 will be in positive engagement with a cam 57, provided the feed-drum should be advanced sufficiently to pass the notch 58, from which the toe had been lifted, beyond said toe and, when the high portion of a cam 57 is engaged with the screw 69, the feed-drum is compelled to stop and cannot be given a further feeding movement until said cam and screw are disengaged. Hence, the feed movement of the feed-drum is positive and intermittent and can only be imparted by the plunger operating the bell-crank lever 65 in the manner described. This is an important feature of my invention because it prevents the removal of stamps or other articles from the machine except as indicated and according to the rule of action of the machine.

In order that every feed movement of the feed-drum shall be registered and every article delivered accounted for, a counting-device 83 of any common construction, such as the Vetter, is secured to the frame-portion 1 on the outside thereof adjacent the feed-drum, said counting-device having connected to its shaft 84 an angular arm 85, extending through a slot 86, in said frame-portion, and having its outer end 87 normally held by the spring 88 in the path of movement of the pins 59 in the end of the feed-drum. One of the pins striking the arm-end 87 will move the shaft of the counter sufficiently to cause a registration of the feed movement and, as the pin passes, the spring will return the arm to its normal position.

From the foregoing description, the mode of operation of this form of my invention will be fully understood from the following:

By shifting the latch 47, the reservoir will be unlocked and enabled to swing downwardly away from the feed-drum, this movement releasing the latch 21 from the catch 20 of the cover, enabling the latter to be lifted to open the receptacle for the admission of the reel of articles. The reel and holder being inserted in the machine, the end of the web will be passed between the frame-portion 19 and the top of the reservoir, and thence carried around the feed-drum 50, above the strip-guide 35, and under the stripper-plate 89 and through the slot in the face-plate 42. The cover will then be lowered and the reservoir swung into closed position, by which movement the cover is locked, as will be readily understood on reference to Fig. 4. The latch 47 will then be turned to lock the reservoir in working position. This enables the web to snugly encircle that portion of the feed-drum arranged opposite the reservoir and the feed-pins 55 to project through the perforations between the adjacent stamps, or other articles, and into the longitudinal slots of strip-guide 35, secured to the upper end of the reservoir. If it so happens that the perforations are not in position to be entered by all of the feed-pins 55, those that do not enter will be depressed into the feed-roll against the tension of their springs. In this connection, it should be noted that it is not necessary that all of the pins in a row shall enter the perforations between articles at the same time; but, it is intended that said pins shall be so spaced that any two or more may register with the perforations, while the others may be depressed by contact with the web or solid portions of the articles, it being understood that perfect and positive feeding is accomplished by the coöperation of one or more of said pins with a like number of perforations. Hence, the importance of this portion of my invention resides in the fact that the feed-pins are so arranged that some of them will always register with the perforations even though the latter should not be properly spaced, or not be in a straight line, thus avoiding the liability of failure to feed the articles, which might result from an attempt to space the pins correspondingly with the perforations; that is to say, it is well known that the perforations between stamps, for example, are not always evenly spaced and do not always follow in a straight line, so, by making the pins yielding, the stamps are not injured and compensation is had for irregularity in spacing or line-up of perforations. The spacing of the feed-pins may be such that alternate pins will engage, or register, with perforations between the stamps, the pins not engaging being depressed within the drum by engaging with the stamp-strip; and, as two rows of pins are always in position to register with a corresponding number of rows of perforations, the strip will always be properly fed, since one of the two series of pins will surely register with some of a series of perforations and, on the next feed movement, other sets of pins will be in position to engage succeeding series of perforations. However, the lines or series of feed-pins are spaced approximately the distance between rows of perforations between the articles, and yet, if a greater distance apart, said pins would find the perforations when moved up to them, and cause a proper feed movement by some of the pins entering some of the perforations. Therefore, it will be seen that both circumferentially and laterally, the feed-drum is so constructed that a positive and accurate feed-movement is produced for every successive movement of rotation thereof. The springs 52 are not sufficiently strong to cause the pins to either penetrate or injuriously engage, or bear upon the stamps, should they not happen to register with the perforations. Nevertheless, by reason of the strip-guide 35 and the slots therein, as the feed-drum is rotated, one or more of the pins will find one or more of the perforations between the articles and thus perform the function of positively feeding the same forward for delivery. The plunger will now be depressed, by pressure upon the head 9, which will, as set forth in my aforesaid application, drive water through the meter or valve 25 and spray the same through the nozzle 24 upon the article. During the movement of the plunger downwardly, the longer pin 48 actuates the lever 49 to actuate the meter 25, thus carrying a measured quantity of water around to the spraying-nozzle. Further downward movement of the plunger will cause its pin 80 to push aside the pawl-arm 79 and help to hold the toe 70 in a notch 58, thus holding the feed-drum from movement. Also, the feed-pawl will yield in passing one of the feed-drum-actuating pins 59; and continuation of the downward movement of the plunger causes the cutter to cut an article from the web, which will be moistened or gummed prior to the cutting operation, and affixed at the end of the downstroke of the plunger, if desired. The feed movement takes place on the return movement or up-stroke of the plunger by the long arm 61, of the feed-pawl, engaging one of the pins 59; but, prior to this movement to feed the drum, the pin 80 engages the pawl-arm 79, on the bell-crank lever 65, thus moving the toe 70 of said lever from the notch 58 in the periphery of the feed-drum in which it has been set, after which the pawl-arm 61, in its upward movement, will drive the feed-drum to impart thereto the feeding movement. As the plunger continues to rise and its pin 80 passes the pawl-arm 79, the bell-crank lever is forced toward the feed-drum and its toe 70 engages an adjacent cam-surface, said toe being thus ready to drop into a notch as the drum revolves to impart the proper feeding movement. Positive engagement of the toe 70, with a notch 58, is caused by the high portion of the cam 57, engaging said toe so that the latter cannot override the notch into which it should descend, and the spring 75, bearing upon the bell-crank lever 65, forces said toe into said notch, thus stopping the feed movement of the drum at the proper point. This action of the lever 65 causes the pin 69, on arm 67, to be lifted above the path of the high point of the cam 57, as shown in Fig. 4; but, should the drum be turned while the toe 70 of arm 68 is free of a notch 58, the drum would be prevented from having a feed movement,—or being manipulated in any way so as to obtain an article without operation of the plunger 7 or registering its action,—by the engagement of the pin 69 with the high wall of an adjacent notch 58, or by entering said notch, thus locking the drum from movement in either direction. This is an important part of my invention, since the arm 68 and its toe 70 coöperate with the arm 67 and its pin 69 to control the action of the feed-drum and insure its proper action at the proper time. The arm 61 of the feed-pawl, as the plunger 7 moves down, will be lifted by engagement with a feed-pin 59, and subsequently, near the end of the down-stroke of said plunger, will be depressed or reset, by engagement of arm 62 with cam 63 on the side of the frame-part 2,—see Fig. 14. No overthrow or backlash of the feeding and controlling devices is thus possible, the feeding movement is positive and the stops between feeding movement are positive, so that only one stamp at a time can be fed from the machine for each complete reciprocation of the plunger, the delivery of the article taking place on the up-stroke of the plunger and only according to the proper action of the machine.

For every feed-movement of the drum, one of the studs 59 engages the lever 85 of the counting-device 83, giving to said lever a complete movement in one direction, thus registering the feed-movement or stamp-delivery, the spring 88 returning said arm to its normal position for coöperation with the succeeding studs on the feed-drum.

Thus it will be seen that for every complete reciprocation of the plunger a complete feed-movement is accomplished, which delivers an article from the web, and if desired in position to be sprayed, cut and affixed, and that said article is cut from the web and may be sprayed and pressed by the bottom of the cutter-holder upon the article to which it is to be applied. It will also be seen that every feed-movement is counted or registered; that every feed-movement is positive; that, after each feed-movement, the feed-drum is locked against any further feed-movement until the plunger again descends to actuate the feed-drum; and since some of the feed-pins are in coöperation with some of the holes in the strip of articles none of the articles can be drawn through the machine by hand. Hence, every article delivered from the machine is accounted for and filching from the machine is prevented. And among the important features of my invention is the means by which the registering mechanism and the feeding mechanism coöperate to effect the counting of each and every article delivered, since the feed-drum is guarded against manipulation other than in a regular way; also, the means which prevents operation of the register, except when the drum has been moved far enough to properly feed an article, is important. And by placing the arm 87 and spring 88 out of reach and covering them, they cannot be manipulated from the outside.

Figure 3:
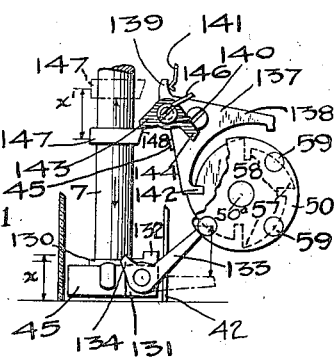
Fig. 3 is a detail showing the feed-actuating mechanism of this form of my invention in a different position.

In that form of my invention illustrated in Figs. 1, 2 and 3, the cover 17 is provided, on its inside, with a latch-spring 91, secured to said cover by means of a screw 92, and having at its outer end a stud 93, which enters an aperture in the frame-portion 19 of said receptacle. The spring is bowed so as to clear a key-hole slot 94, in the cover-portion 17, in which slot may be inserted a key, the tongue of which, when turned, may engage and lift said spring 91, and thereby remove its stud 93 from said aperture, thus releasing the cover-portion 17 and enabling it to be swung outwardly on its pivot 18, for the insertion of the reel.

The drum-actuating means, however, have been slightly modified in certain details in that form of my invention shown in Figs. 1, 2, 3, 11 and 12. That is to say, fixed to the top of the cutter-head 45, between the same and the plunger 7, is a plate 130, the forward end of which is provided with a depending bearing 131, lying against, and parallel with, the cutter-head at one side thereof, said plate being also provided with a vertically-extending lug 132, near its forward end. To the bearing is journaled a feed-pawl, the long arm 133 of which extends rearwardly in the path of the laterally-extending pins 59, carried by the feed-drum 50, this arm lying normally substantially horizontal. The short arm 134 of the pawl extends substantially at a right-angle to the long arm and normally substantially parallel with the plunger and is provided with a horizontally-extending lug 135, which coöperates with the lug 132 on the plate. The long arm of the pawl works in a vertical slot 136, in the face-plate 42, the walls of which guide the same and prevent any lateral or springing movement under any circumstances. Journaled in the frame, above the feed-drum, is a controlling-lever 137, given the form substantially of a bell-crank with a portion of one side cut out so as to provide arms 138, the extreme ends of which are inturned for coöperation with the notches 58, in the periphery of the feed-drum or a plate secured thereto. This lever constitutes part of a drum-controlling or detent mechanism and has an extension 139 back of its pivotal point 140, with which coöperates a spring 141, the normal tendency of which is to force the lower inturned end or toe 142 into engagement with one of the notches 58, or into engagement with one of the peripheral cams 57. Just in rear of its pivot, the controlling-lever has fulcrumed to it an actuating-dog or tappet in the form of a bell-crank lever, one arm 143 of which extends toward the plunger and the other arm 144 of which extends downwardly and coöperates with a lug 145, extending laterally from the lever 137. A spring 146, surrounding the journal of the dog and having one end bearing upon the top of the controlling-lever and the other end bearing upon the dog, keeps the latter normally in engagement with the lug, this being the operative position of the dog to lift the controlling-lever from engagement with the feed-drum so that the latter may be given a feed movement. A cam-projection or collar 147 is fixed to the plunger 7, in proper coöperative relation to the dog, and is provided on its actuating-face with an inclined surface or cam 148. As the plunger moves downwardly, the cam engages the arm of the dog, presses it downwardly against the power of its spring, thus tending to force the inturned end or toe 142 of the controlling-lever into a notch 58 of the feed-drum, thus preventing the same from having any movement during the downward movement of the plunger. This is essential, since on the downward movement of the plunger the actuating-pawl engages a pin 59, with a tendency to rotate the feed-drum, such rotation being prevented by the controlling-lever, the toe of which, as just stated, coöperates with one of said notches and is held firmly therein by the combined action of the spring and dog. As the plunger reaches substantially its lower limit of movement, the arm 133 of the feed-pawl passes the pin with which it engages on its downward stroke and substantially at the same time the cam 63 tilts it back into its substantially horizontal position, shown by the dotted lines in Fig. 3. Substantially at the same time, the controlling-dog is released by the cam-collar 147 and allowed to assume the position shown in Fig. 2, with its depending-arm in engagement with the lug 145 of the controlling-lever. In this condition, the feed-drum is locked against a feed movement, the feed-pawl is ready to impart a feed movement to the feed-drum and the controlling dog is ready to lift the toe of the controlling-lever from engagement with the notch 58. The upward movement of the plunger causes the cam-collar to engage the horizontal arm of the dog, which, through its depending-arm, operates the controlling-lever and moves its detent-toe 142 from the notch 58, thus freeing the feed-drum preparatory to a feeding operation. Subsequently, on the continued upward movement of the plunger, the long arm of the feed-pawl engages the pin immediately above it and as said pawl is now rigidly set with its short arm against the lug 132, the feed-drum is given a movement of rotation corresponding in extent with the movement of the feed-pawl until the latter has passed by the coöperating-pin, the latter, during the rotation of the drum, moving in the arc of a circle away from and off the end of said feed-pawl. The parts are so proportioned and the extent of their movements is such that an article of a given length, such as a stamp or a ticket, for example, is fed forward along the strip-guide, by the feed-pins of the feed-drum, under the stripper-plate and through the throat-plate into position to be severed by the cutter 44, on the succeeding downward movement of the plunger. The sequence of operation of this form of my invention is substantially the same as that of the form shown in Figs. 4 to 6, etc., since the feed movement of the drum takes place on the up-stroke of the plunger and the severing action occurs on the down-stroke of the plunger, during which down-stroke an article may be moistened or gummed. There is this difference, however, between the operations of the machine of the two forms of my invention, viz., that on the down-stroke of the plunger, in the form of my invention shown in Figs. 4 to 6, etc., that article which is to be immediately severed is gummed or sprayed just previous to being severed; but, in the form of my invention shown in Figs. 1 to 3, that article which is severed on the down-stroke of the plunger has been gummed or moistened by the moistening-device on a previous up-stroke of the plunger, in consequence of which the article, when fed forward on the up-stroke of the plunger, is moistened and ready for the severing and affixing operations. In other words, in the form of Fig. 4, the moistening takes place after the feed-stroke and substantially simultaneously with the severing operation, while in the form of Fig. 1 the moistening occurs during the feeding action and before the severing movement of the plunger begins, the moistening-pads aiding the feeding operation. In the form of my invention shown in Figs. 1 to 3, the roll of articles is inserted in the machine by unlocking the cover 17 and swinging it up, thus enabling the strip-guide and reservoir to be swung downwardly out of the way and out of coöperation with the feed-roll. The reel is then inserted and the end threaded down to the feed-drum, as in Fig. 1, the pins on the feed-drum being entered into the perforations of the stamps. The strip-guide and the reservoir are then swung back and the cover 17 closed, whereupon the spring-catch 91 locks the parts in place. By this it will be seen that the receptacle and strip-guide are locked one by the other and independently of all other parts of the machine.

From the foregoing description, it will be seen that the moistening mechanisms are interchangeable, as are also the feed-drum-actuating mechanisms, it requiring, in either instance, but a slight change in one or the other of the frames and parts of the machine of Figs. 4 to 6, etc., to adapt any of the mechanisms thereto. In other words, with only a few slight changes in the frame-parts of Figs. 4 to 6, etc., the moistening-device in either of these figures can be interchanged, likewise the feed-drum-actuating means.

I desire to stress again that important feature of the feed-actuating mechanism which involves the idea of means of preventing any feed movement of the feed-drum taking place until after the plunger has been moved to its lowermost limit, and then caused or allowed to ascend to approximately the point indicated by the parallel lines $x$, $x'$, in Fig. 3, at which time the feed-drum is released by the controlling-lever preparatory to a feed action, the said feed-drum being up to such times positively locked against a feed movement. In consequence, a person may fool or tamper with the machine indefinitely by reciprocating the plunger between extremes, but until the extreme of downward movement has been reached no feed movement can be imparted to deliver articles from the machine. Hence, the machine is safe against any attempt to extract a stamp or article without being accounted for and every article that is delivered is registered on the counting-device, which, obviously, can be applied to the form of my invention shown in Figs. 1 to 3 in the same manner as shown in the form of my invention of Figs. 4 to 6, etc.

Another very important feature of my invention is a means by which the feed-drum is positively locked against any movement whatsoever on the instant that the article or strip is torn or broken, so that it cannot be properly fed, or becomes exhausted from the machine, or when there is no reel of articles in the machine, or the strip has not been placed in proper coöperative relation to the feed-drum. This means I have shown in Figs. 1, 7, 10, 11, 12 and 18. It consists of a locking-pin 100, the executive end of which is rounded so as not to tear or scratch the articles or strip, said pin being provided with the disk or shoulder 101, against which bears one end of the coiled-spring 102, the other end of which bears against the bottom of the socket 103, in the feed-drum 50, in which socket the said pin operates and in which it is guided by the screw-plug 104, which is adjustable for the purpose of limiting the extent of projection of the pin 100, as also the power of the spring 102. The stop-pin 100 coöperates with the strip-guide 35 by entering the elongated slot 105, extending longitudinally of one of the parts of said guide. Normally, the stop-pin 100 coöperates with the strip and is pressed by its spring against the strip and depressed into its socket by the strip as the latter is fed between the drum and the strip-guide 35. Should the strip break or become exhausted, or should said strip not be threaded properly in the machine so as to be interposed between the stop-pin and the coöperating aperture 105, said pin, as the feed-drum is turned for a feeding operation, will spring into the slot 105 and thus lock the drum from further movement. Preferably, four of these stop-pins are provided circumferentially around the feeding-drum 50 and are disposed between the series of feeding-pins 55 and nearer one end of the drum than the other, this arrangement resulting in bringing about the operation of the locking-device to stop the feed of the drum, for example, when the last article has been fed from the machine. This feature of my invention is doubly important, both as a locking-device for the feed-drum and as a means to prevent operations of the machine, which could take place in its absence and in the absence of articles in the machine, from being registered on the counter 83. Hence, the counter is made to register only actual deliveries of articles from the machine.

Figure 15:
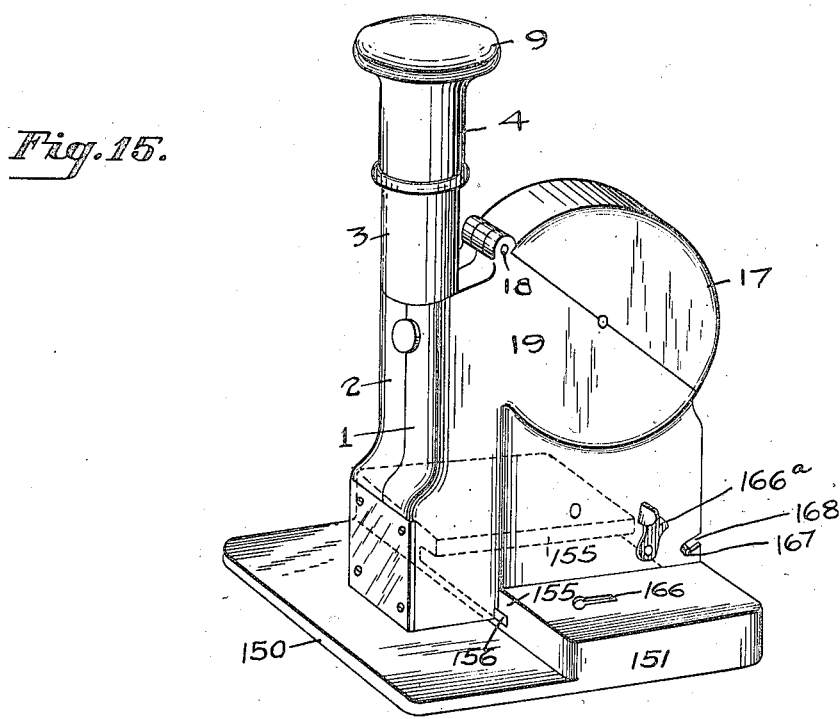
Fig. 15 is a perspective view of the machine locked to a support or base.
Figure 16:
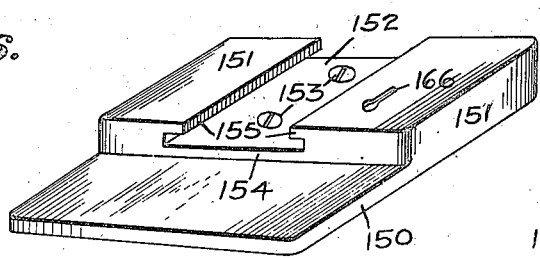
Fig. 16 is a perspective view of the support.
Figure 17:
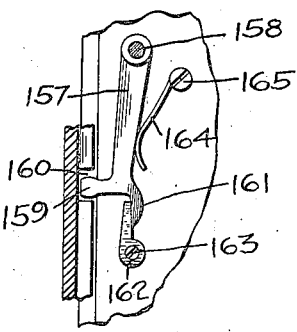
Fig. 17 is a sectional detail showing the means for locking the machine to the support.
Figure 18:
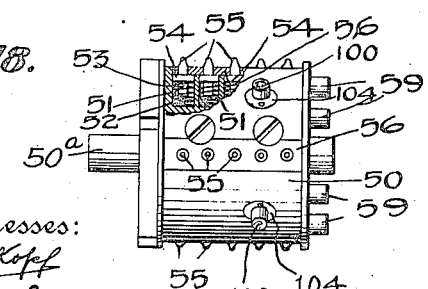
Fig. 18 is a front elevation of the feed-drum, a part being broken away to show details of construction.

In the foregoing description, I have described my machine more particularly with reference to its portable character, since it is obvious that, by reason of its compact structure and simple form, it can be easily handled and carried about the office, or from place to place, without restriction and readily used for vending tickets, checks, and affixing stamps or labels to bulky packages, for example; but, there are times when, and conditions under which, it may be desirable or necessary to fix the machine in position upon a table or desk so that it may not be carried away and that it may always be readily found or located for use. With this object in view, I have provided a support or fixture to which my machine may be detachably secured and firmly locked in place against removal and at the same time prevent tampering with the machine, or removing the stamps or other articles in any manner. This part of my invention is illustrated in Figs. 15 to 17, wherein the support is shown to consist of the front platform or receiver 150, a rear portion or support 151, in the center of which is a dove-tail groove 152, in which the machine is set. The support may be secured to a table, desk, or other piece of furniture, by means of screws 153 passing through the bottom of the groove and into said furniture. The bottom of the groove is elevated from the surface of the platform a short distance, as indicated at 154, this being for the purpose of separating the forward or delivery end of the machine from the said platform and so as to enable thin, flat articles to be slid under the delivery end of the machine for the purpose of having a stamp or label affixed thereto in the event the machine is used for that purpose. For the purpose of coöperating with the overhanging portions 155 of the groove, the machine is provided along its bottom, on opposite sides, with longitudinal ribs or flanges 156, of a size sufficient to fit snugly but slide freely in the said groove. Hence, the machine can have in said groove only longitudinal movements parallel with the surface of the support. In order to securely lock the machine in the support, a spring-controlled latch, in the form of a lever 157, is pivoted at 158 within one of the portions 151 of the support, the same being made hollow for the purpose. As shown in the drawings, the right-hand portion is so constructed, and the lever 157 is pivoted therein and is provided at its forward end with the locking-tongue 159, given any form desired and coöperating with a recess 160, in the adjacent flange 156 of the machine-frame. To limit the forward or locking position of the lever, the latter is provided with the extension 161, coöperating with the stop 162, fixed at 163, by means of a screw. The locking-lever is normally held in locking position by means of a spring 164, normally engaging the lever and pressing it toward the recess 160 and the flange 156, the spring being fixed in place by means of the screw 165. In order to release the machine from its support, the locking-lever may be manipulated by means of a key entered through the hole 166 in the support, so that its tongue may engage the lever and thus move it against its spring control and thus remove the locking-tongue 159, from the recess 160, in the flange 156. Hence, the machine is firmly locked in its support and yet capable of being quickly removed by one in possession of the key.

In connection with the locking means for the feeding-device, I desire to have it understood that the locking-pin operates automatically to lock the drum from movement in the event there are no articles in the machine or the web or articles become exhausted, or are accidentally torn off or broken, or otherwise separated at a point above the locking-slot in the strip-guide, or for any other reason the articles in the machine fail; and, in order that this mechanism may be comprehended by a definite phrase or expression in the claims, I will, in the latter, define the same, or the function thereof, by the expression "when the article fails." By this expression I intend to have the means recited understood to have the functions as hereinabove expressed.

The cam-lever 166ª, in Fig. 15, pivoted to the frame of the machine, coöperates with the pin 167, carried by the reservoir, and working in the slot 168 is a means for depressing the reservoir when the machine is not in use. This is more fully described in my aforesaid application and it is not herein described more in detail because forming no part of the invention in this case.

Having thus described my invention, what I claim and desire to secure by Letters Patent is:

1. A serving apparatus comprising a rotary feeding device; a reciprocating member for actuating the feeding device; and means, connecting said member and said device, whereby only one feed movement is given said device during any movement of reciprocation of said member, said means including a collar fixed to said member, and a movable device located between said collar and said feeding device and adapted to engage both of them.

2. A machine having, in combination, means for delivering articles therefrom including a reciprocatory plunger, a rotary feed-drum, a lever mechanism between said drum and said plunger, said lever mechanism including means coöperating with the drum for preventing movement being imparted to the drum except as the result of a predetermined movement of said plunger.

3. A feeding mechanism for machines of the character described having a feeding device for engaging the articles to be delivered, said device comprising a cylinder provided with a plurality of pins yieldingly mounted thereon and so spaced that one or more will always coöperate with the perforations between the articles to be delivered.

4. A serving mechanism comprising, in combination, means for delivering articles therefrom; means for actuating said delivering means comprising a reciprocating member and a vibrating member carried by the latter, and vibratory means coöperating with the reciprocating member for positively engaging the delivering means for locking the latter at all times against movement except during the delivering movement.

5. A serving mechanism comprising a feeding mechanism entirely inclosed within the frame thereof, said feeding mechanism including a rotary feed-drum, means for actuating the latter, means for locking the drum except when the actuating means is operating, and connecting means between the drum and actuating means for alternately coöperating with the feeding means and the locking means.

6. A feeding mechanism for machines of the character described comprising a rotary drum, a plurality of peripheral cams spaced apart by notches, means for actuating the drum, means coöperating with the cams and notches to lock and unlock the drum alternately, and a device for actuating the locking means.

7. A feeding mechanism for machines of the character described comprising a rotary drum having a plurality of pointed pins arranged in rows transversely thereof, the pins being arranged in sockets of said drum, and the rows equidistantly spaced apart, means for holding the pins in the sockets, and means for causing the points of the pins to yieldingly project beyond the surface of the drum.

8. In combination with a base having an article-support and a raised support, and a machine for delivering articles therefrom removably secured to said raised support and having its delivery-end overhanging said article-support.

9. A serving apparatus having, in combination, mechanical means for feeding articles therefrom; guiding means coöperating with the feeding means for directing the articles to and from the feeding means; and yielding means provided on the feeding means and coöperating with the guiding means for holding the feeding means from action when the articles fail.

10. A serving apparatus having, in combination, means for holding articles to be delivered; mechanical means for feeding the articles; means for guiding the articles from the holding to the feeding means and, in part, conforming to the latter; and means in part provided on the feeding and guiding means for positively locking the former from action when the articles fail.

11. The combination with a base having a portion for supporting articles; and an elevated portion adjacent thereto; a machine supported on said elevated portion and having a portion of its bottom open, said machine extending beyond the elevated portion to provide a delivery exit through said open bottom to the article-supporting portion of said base; and locking means for securing the machine and base together.

12. A support for a machine comprising a portion for supporting articles thereon, and an elevated portion to receive a machine, said elevated portion having a groove with overhanging sides, and retaining means carried by the base and extending through one of the sides of the groove.

13. A feeding mechanism for machines of the character described including a feed-drum having a plurality of yieldingly mounted feeding pins projecting therefrom, said pins being round pointed so as not to penetrate the article fed thereby.

14. A feeding mechanism for machines of the character described, comprising a rotary drum having a plurality of pins arranged in rows transversely thereof, the pins being arranged in sockets of said drum, means for holding the pins in the sockets, and means for causing the points of the pins to yieldingly project beyond the surface of the drum.

15. A serving apparatus having, in combination, means for supporting a strip of perforated articles; means for delivering the articles from the machine; means for guiding the articles to the delivering means; the delivering means comprising a rotary feed drum having a plurality of rows of yieldingly mounted pins, the points of the pins normally projecting a distance from the periphery of the drum, whereby the rows of pins may engage the strip of articles, regardless of the perforations therein, and slide thereover until the perforations and pins reach a point of registry.

16. A serving apparatus having, in combination, a rotary feed drum, a plurality of series of round-pointed feeding pins projecting from its periphery, the series of pins being equi-distantly spaced apart around the circumference of the drum for coöperation with the perforations between articles.

17. A machine having, in combination, means for delivering articles therefrom, including an automatically operating intermittent feed device; and means, controlling the feeding device, for preventing articles from being delivered except as the result of a predetermined feed action of the feeding device.

In testimony whereof I have hereunto signed my name in the presence of two subscribing witnesses.

LANSING ONDERDONK.

Witnesses:
  CHAS. McC. CHAPMAN,
  M. HERSKOVITZ.